United States Patent [19]
Kurei

[11] Patent Number: 5,327,183
[45] Date of Patent: Jul. 5, 1994

[54] CAMERA HAVING FLASH

[75] Inventor: Hiroshi Kurei, Tokyo, Japan

[73] Assignee: Asahi Kogaku Kabushiki Kaisha, Tokyo, Japan

[21] Appl. No.: 887,867

[22] Filed: May 26, 1992

[30] Foreign Application Priority Data

May 24, 1991 [JP] Japan .................... 3-222529
May 27, 1991 [JP] Japan .................... 3-223764
May 27, 1991 [JP] Japan .................... 3-223765

[51] Int. Cl.$^5$ ............... G03B 15/02; G03B 15/05; G03B 17/02
[52] U.S. Cl. ..................... 354/129; 354/416; 354/159; 354/147; 354/146
[58] Field of Search ............ 354/129, 413, 137, 147, 354/159, 146, 420, 416

[56] References Cited

U.S. PATENT DOCUMENTS

| | | | |
|---|---|---|---|
| 3,088,390 | 5/1963 | Zimmerman | 354/125 |
| 3,757,654 | 9/1973 | Mori | 354/413 |
| 3,987,468 | 10/1976 | Matsuzaki et al. | 354/146 X |
| 3,995,286 | 11/1976 | Tokutomi | 354/145 |
| 4,003,065 | 1/1977 | Chikashige | 354/137 |
| 4,035,814 | 7/1977 | Nobusawa | 354/139 X |
| 4,268,139 | 5/1981 | Uchiyama et al. | 354/147 X |
| 4,295,722 | 10/1981 | Takahashi et al. | 354/146 |
| 4,760,413 | 7/1988 | Taniguchi et al. | 354/149.11 X |
| 4,996,550 | 2/1991 | Matsui et al. | 354/420 |
| 5,155,519 | 10/1992 | Tokunaga | 354/413 |

FOREIGN PATENT DOCUMENTS

219658 4/1987 European Pat. Off. .
2-32324 2/1990 Japan .
1487742 10/1977 United Kingdom .
8801754 10/1988 World Int. Prop. O. .

OTHER PUBLICATIONS

French Search Report and Annex, Feb. 12, 1993, Heryet.

Primary Examiner—Michael L. Gellner
Assistant Examiner—Jae N. Noh
Attorney, Agent, or Firm—Sandler Greenblum & Bernstein

[57] ABSTRACT

A camera having a flash, a focal plane shutter, a mechanism for changing a size of a film frame by changing a size of an aperture of the camera, and a mechanism for setting a flash synchronized shutter speed. The focal plane shutter has a leading-shutter-curtain and a trailing-shutter-curtain, which are moved in a vertical direction of the aperture to thereby open and close the aperture. The changing mechanism changes the aperture size in the vertical direction to obtain a panoramic style frame and a standard frame. The setting mechanism sets the flash synchronized shutter speed to a high speed when the aperture is changed to a panoramic style frame having a vertical size which is smaller than that of a standard frame. The output of the flash can be started at a time at which a trailing edge of the leading-shutter-curtain passes a lower side of the panoramic style frame.

6 Claims, 13 Drawing Sheets

CAMERA HAVING FLASH

BACKGROUND OF THE INVENTION

1. Field of the Invention

The present invention relates to a camera which is provided with a flash and in which the size of a photograph frame (hereinafter referred to simply as a frame) can be changed by changing the size of an aperture of the camera.

2. Description of the Related Art

In a known conventional single lens reflex camera, when a flash mode is set, in which a flash of intense light is output, a shutter speed is automatically changed to a speed that is synchronized with the output of the flash. The flash-synchronized shutter speed (hereinafter referred to as synchronized speed, but usually known as an X sync speed) is determined by the time between a point at which the output of the flash is begun and a point at which the output of the flash is ended, and is usually set to a predetermined constant time. When the time for which the shutter is fully open is longer than or equal to the predetermined constant time, light output by the flash illuminates the entire area of the frame to be photographed. Therefore, in a conventional camera, a shutter speed at which the shutter can be held in a fully open position for the predetermined constant time is set as the synchronized speed.

FIG. 1 shows the relationship between an operation of the shutter and an open state of an aperture, wherein the vertical axis denotes the vertical direction of movement of the aperture, and the horizontal axis denotes the time. As shown in the figure, reference numeral 51 shows a movement locus along which a trailing edge of a leading-shutter-curtain is moved, and reference numeral 53 shows a movement locus along which a leading edge of a trailing-shutter-curtain is moved; i.e., these reference numerals 51 and 53 show characteristic lines of movement of the shutter as a whole. Further, reference numeral 61 shows a position of an upper side of a normal aperture (full size), and reference numeral 63 shows a position of a lower side of a normal aperture. An area limited by the leading-shutter-curtain movement characteristic line 51 and the trailing-shutter-curtain movement characteristic line 53 is that within which the aperture is open.

When the shutter speed is indicated by $T_A$ and the fully-open time is indicated by $T_C$, the fully-open time $T_C$ is a time $(t_A - t_X)$ beginning at a time $t_X$ at which the leading-shutter-curtain movement characteristic line 51 crosses the lower side 63 and ending at a time $t_A$ at which the trailing-shutter-curtain movement characteristic line 53 crosses the upper side 61. Note, a conventional camera is provided with an X contact that is turned ON at the time $t_X$ so that the flash is output in synchronization with a movement of the leading-shutter-curtain, by this ON operation of the X contact.

As described above, in a focal plane shutter, an upper limit of the synchronized speed (i.e., the highest shutter speed) depends upon a time from that at which the leading-shutter-curtain has fully opened the aperture to a time at which the trailing-shutter-curtain begins to close the aperture; i.e., the time for which the shutter is fully open.

Recently, a camera has been developed by which a picture can be taken in a standard frame size and in a panoramic style frame size; this panoramic effect is obtained by reducing the vertical height of the aperture, to thereby form a rectangular frame in which the vertical sides thereof are much shorter than the horizontal sides. Namely, in this camera, the size of aperture can be changed between the standard size and the panoramic style size. When the aperture size is reduced to obtain a panoramic style picture, a space between the upper side 61 and the lower side 63 of the aperture is reduced in FIG. 1. Therefore, a time for which the aperture is fully open is prolonged, even though the same shutter speed is used as that for the standard frame. Note, preferably the synchronized speed is as high as possible when photographing with a daylight synchronized flash, but in a conventional camera the synchronized speed is constant, regardless of the size of the aperture.

SUMMARY OF THE INVENTION

Therefore, an object of the present invention is to provide a camera in which the synchronized speed can be changed according to a size of an aperture.

According to the present invention, there is provided a camera including a flash device including a focal-plane shutter, an aperture changing mechanism, and a flash-setting mechanism. The focal-plane shutter has a leading-shutter-curtain and a trailing-shutter-curtain which are moved in a predetermined direction to open and close an aperture and thereby expose the film. The aperture changing mechanism changes a size of the aperture to an aperture size corresponding to the predetermined direction in which the leading and trailing-shutter-curtains are moved. The flash-setting mechanism sets a flash-synchronized shutter speed in accordance with a size of the aperture changed by the changing mechanism.

Further, according to the present invention, there is provided a camera including a flash device including a focal-plane shutter, an aperture-changing mechanism, and a flash-setting mechanism. The focal-plane shutter has a leading-shutter-curtain and a trailing-shutter-curtain which are moved in a predetermined direction to open and close an aperture and thereby expose the film. The aperture-changing mechanism changes a size of the aperture to an aperture size corresponding to the predetermined direction in which the leading and trailing-shutter-curtains are moved. The flash-setting mechanism starts output of a flash when the leading-shutter-curtain has fully opened the aperture, regardless of the size of the aperture set by the changing mechanism.

Furthermore, according to the present invention, there is provided a camera including a flash device comprising a focal-plane shutter, and aperture-changing mechanism, a switching mechanism, and a control mechanism. The focal-plane shutter has a leading-shutter-curtain and a trailing-shutter-curtain which are moved in a predetermined direction to open and close an aperture and thereby expose the film. The aperture-changing mechanism changes a size of the aperture to an aperture size corresponding to the predetermined direction in which the leading and trailing-shutter-curtains are moved. The switching mechanism switches the flash to the output mode. The control mechanism controls the switching mechanism in accordance with the size of the aperture such that the output of the flash is ended just before the trailing-shutter-curtain starts to close the aperture.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
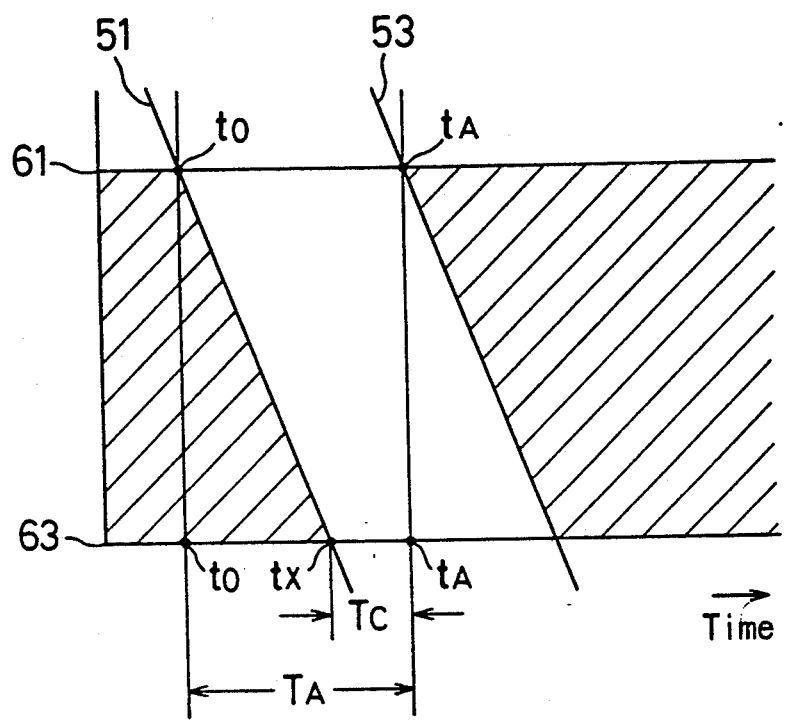
FIG. 1 is a graph showing a relationship between a movement of the shutter-curtains and the opening of an aperture.

The present invention will now be described with reference to embodiments shown in the drawings.

Figure 2:
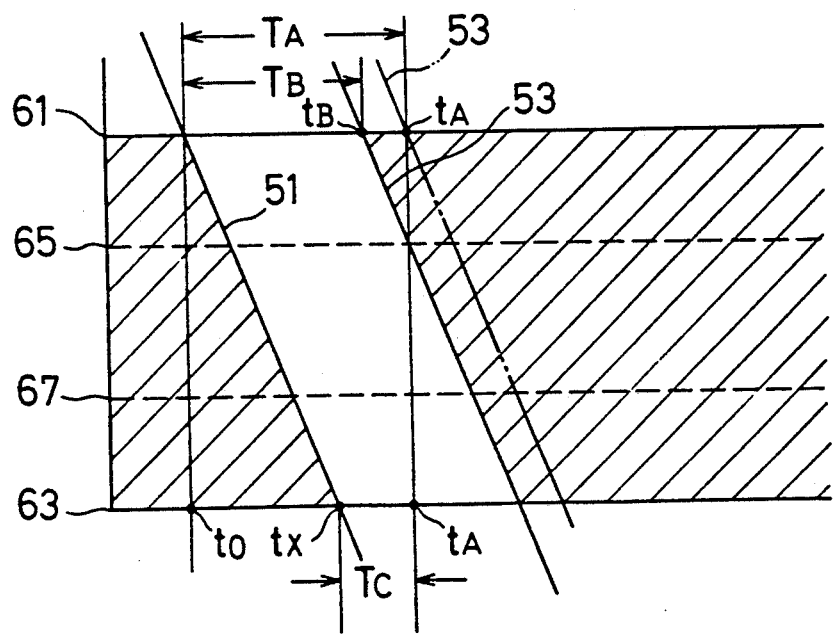
FIG. 2 is a graph showing a shutter operation characteristic of a first embodiment according to the present invention.

FIG. 2 is a graph showing a shutter operation characteristic of a camera of a first embodiment, which comprises an aperture size changing mechanism by which the aperture size can be changed between a standard frame size and a panoramic style frame size. In this graph, solid straight lines 61 and 63 denote an upper side position and a lower side position of the standard frame, respectively. Broken lines 65 and 67 denote an upper side position and a lower side position of the panoramic style frame, respectively. Reference numeral 51 shows a characteristic line of movement of a trailing edge of a leading-shutter-curtain, and reference numeral 53 shows a characteristic line of movement of a leading edge of a trailing-shutter-curtain. An area defined by the leading-shutter-curtain movement characteristic line 51, the trailing-shutter-curtain movement characteristic line 53, the upper and lower sides 61 and 63 of the standard frame, or the upper and lower sides 65 and 67, is an opening area of the shutter.

It is assumed that the trailing-shutter-curtain movement characteristic line 53 crosses the upper side 65 of the panoramic style frame at a time $t_A$, and a fully open time $T_C$ is defined as the time from a point at which an X contact is turned ON to the time $t_A$ and the flash is output for a flash output time $T_{CO}$. As understood from FIG. 2, if $T_C = t_A - t_X \geq T_{CO}$ is satisfied, the shutter speed $T_A$ is proper as the synchronized speed. Therefore, the highest shutter speed at which the flash can be output for a fully open shutter in the panoramic style frame is obtained when $T_C = T_{CO}$ is satisfied. In this embodiment, a shutter speed satisfying this equation is defined as a panoramic synchronized speed $T_B$, and this is obtained by an equation $T_B = t_B - t_0$, wherein the trailing-shutter-curtain movement characteristic line 53 crossing the upper side 65 of the panoramic style frame at a time $t_A$ crosses the upper side 61 of the standard frame at a time $t_B$.

Accordingly, it can be easily understood that the panoramic synchronized speed $T_B$ is higher than the standard synchronized speed $T_A$, which is a synchronized speed for the standard frame, and the difference between the panoramic synchronized speed $T_B$ and the standard synchronized speed $T_A$ is $(t_A - t_B)$, which is a time taken by the trailing-shutter-curtain to pass from the upper side 61 of the standard frame to the upper side 65 of the panoramic style frame.

Figure 3:
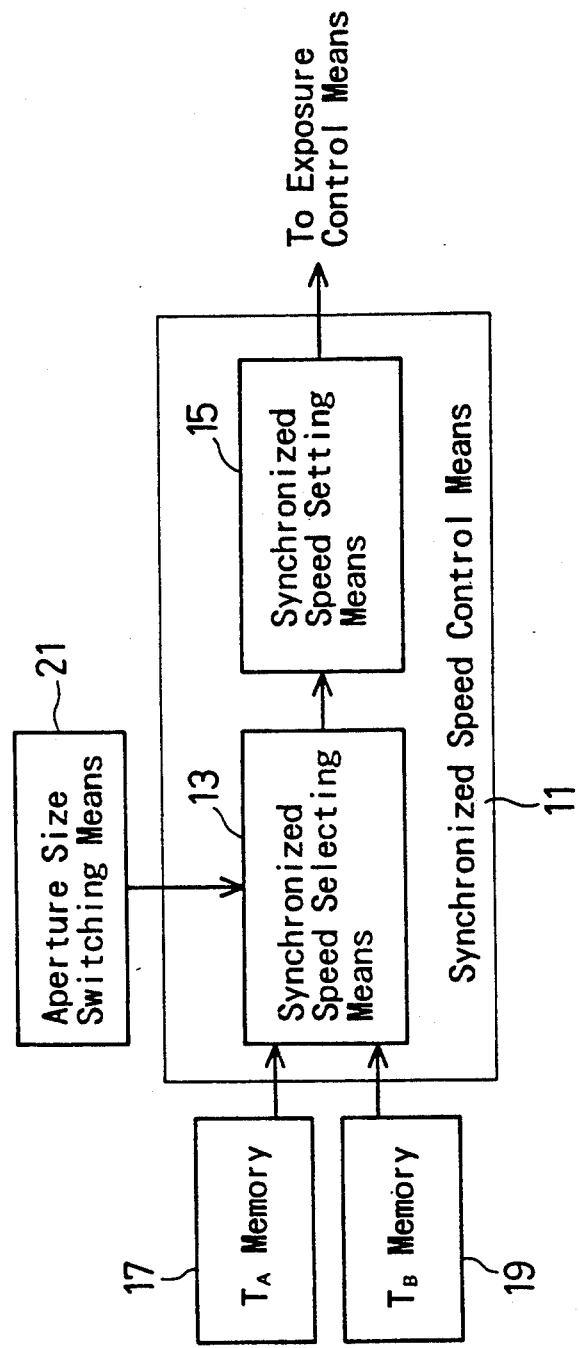
FIG. 3 is a block diagram showing a main part of a synchronized speed changing device of the first embodiment.
Figure 4:
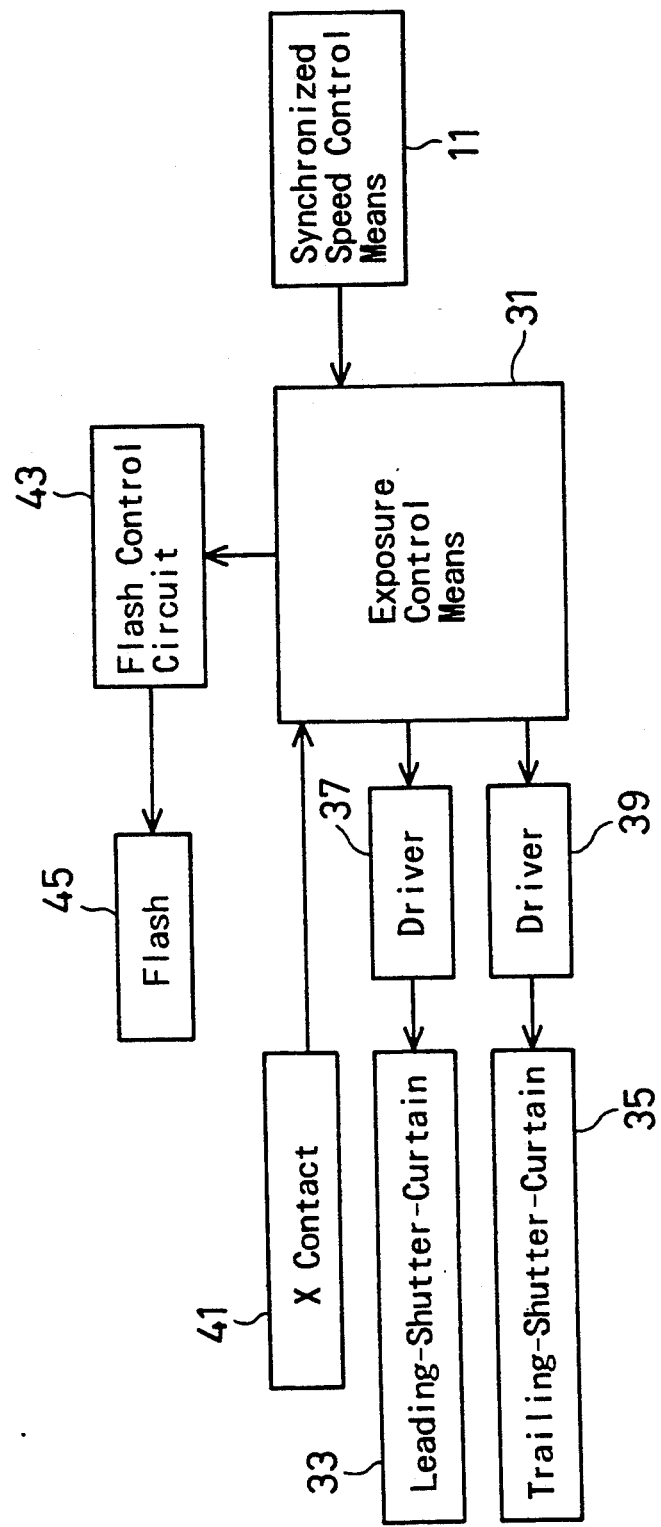
FIG. 4 is a block diagram showing a main part of an exposure control device of a camera to which the synchronized speed changing device of the first embodiment is applied.

A construction of a device for switching a synchronized speed between the standard synchronized speed $T_A$ and the panoramic synchronized speed $T_B$ is described below with reference to FIGS. 3 and 4. As shown in these figures, a synchronized speed control means 11 includes a synchronized speed selecting means 13 and a synchronized speed setting means 15. A standard synchronized speed memory 17 stores the standard synchronized speed $T_A$, and a panoramic synchronized speed memory 19 stores the panoramic synchronized speed $T_B$. One of the standard synchronized speed $T_A$ and the panoramic synchronized speed $T_B$ is selectively read by the synchronized speed selecting means 13, and stored in the synchronized speed setting means 15 as a synchronized speed.

An aperture size switching means 21 switches an aperture size between the standard frame (a full size frame) and the panoramic style frame (a reduced frame). The synchronized speed selecting means 13 selects a synchronized speed according to an aperture size set by the aperture size switching means 21. The synchronized speed setting means 15 sets the synchronized speed selected by the synchronized speed selecting means 13 and outputs the set synchronized speed to an exposure control means 31 described later. Namely, the synchronized speed setting means 15 sets the standard synchronized speed $T_A$ when the standard frame is selected, and sets the panoramic synchronized speed $T_B$ when the panoramic style frame is selected.

The synchronized speeds $T_A$ and $T_B$ set by the synchronized speed setting means 15 are read by the exposure control means 31 when a flash mode is set in the camera, and accordingly, the shutter is controlled at the synchronized speed $T_A$ or $T_B$.

The camera is provided with the exposure control means 31 for executing a calculation for an exposure, and a control of the exposure through a focal-plane shutter having a leading-shutter-curtain 33 and a trailing-shutter-curtain 35. The camera is further provided with drivers 37 and 39 for controlling the movement of the leading-shutter-curtain 33 and the trailing-shutter-curtain 35, respectively, an X contact 41, and a flash control circuit 43 for controlling a flash 45. Note, a camera is usually provided with a taking lens, an aperture stop, a photometry device, a release button, a film winding mechanism and so on, but as a description of these components is not necessary to an understanding of the present invention, a description thereof is omitted.

The leading-shutter-curtain 33 and the trailing-shutter-curtain 35 are driven by shutter charge springs (not shown) in a release operation to be moved in a vertical direction to thus open and close an aperture and thereby expose the film. The shutter charge springs are charged by compressing or stretching the same in association with a film winding operation, and are engaged with mechanical engaging members so that the charged spring forces are maintained until required for driving the shutter curtains 33 and 35. Namely, in a shutter release operation, the mechanical charged spring forces are sequentially released by the drivers 37 and 39 in accordance with a shutter speed, and thus the leading-shutter-curtain 33 and the trailing-shutter-curtain 35 are moved by an elastic restoring force of the charged springs. The X contact 41 is operated in association with the leading-shutter-curtain 33, and is turned ON when the leading-shutter-curtain 33 has completely opened the standard frame. When the X contact is turned ON, the flash control circuit 43 causes the flash 45 to output light.

Figure 5:
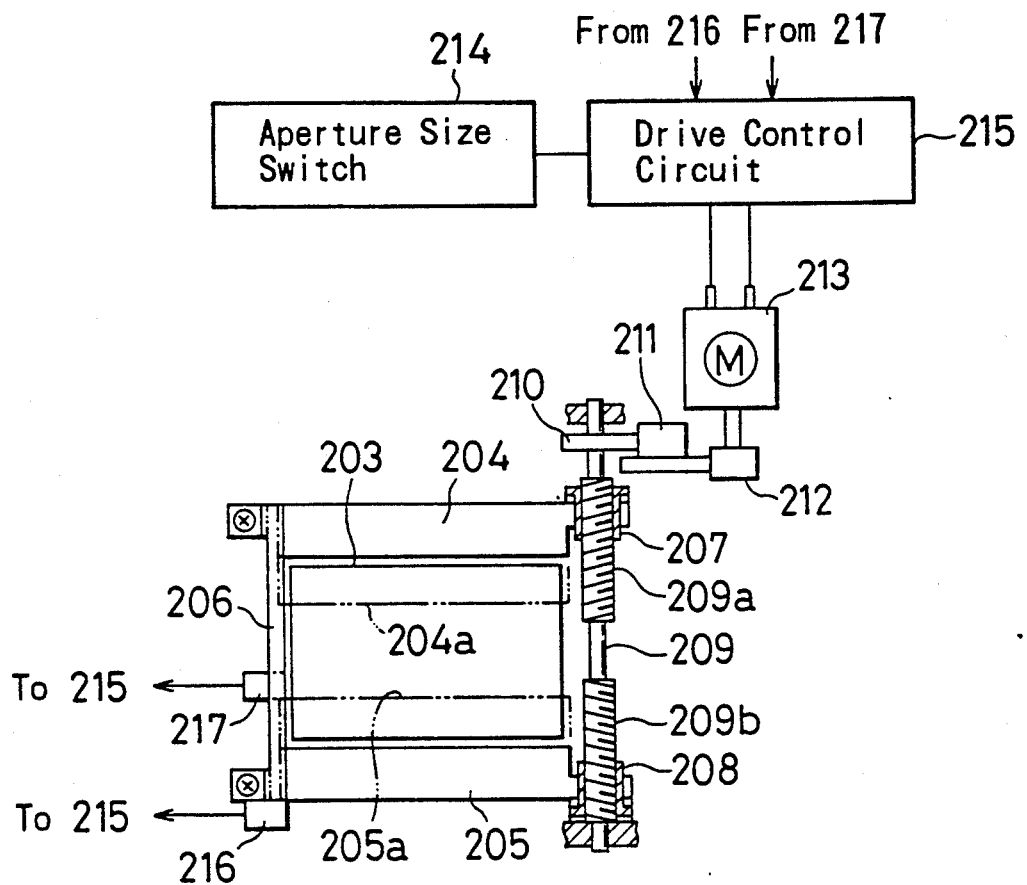
FIG. 5 is a construction of an aperture size changing mechanism.

The aperture size switching means 21 can be constructed in several different ways. Namely, the aperture size switching means 21 may be constructed in such a manner that shade plates shade upper and lower portions of an aperture, respectively, so that these portions are not exposed. Note, the upper and lower portions are located at opposite positions in a direction in which the leading-shutter-curtain 33 and the trailing-shutter-curtain 35 are moved. Alternatively, the aperture size switching means 21 can be constructed in such a manner that the upper and lower portions are exposed to light when the film is wound, or can be constructed in such a manner that information is displayed showing that the size of the aperture is reduced to that of a panoramic style frame. The construction in which upper and lower portions of an aperture are shaded by shade plates, respectively, is shown in FIG. 5.

A full size aperture is defined by an inner periphery of an aperture 203. The leading-shutter-curtain 33 and the trailing-shutter-curtain 35 are moved vertically from the upper portion of the aperture 203 to the lower portion of the aperture 203, to thus open and close the aperture 203.

A pair of shade plates 204 and 205, which have a length longer than a width of the aperture 203, are disposed outside the upper and lower sides of the aperture 203, respectively. One end of the shade plate 204 and one end of the shade plate 205 are slidably supported by a guide plate 206 that is extended along a vertical side of the aperture 203. A pair of nuts 207 and 208 having left and right hand threads, respectively, are fixed at the other ends of the shade plates 204 and 205, respectively. These nuts 207 and 208 are threadingly fitted on screws 209a and 209b, respectively, of a shaft 209 disposed outside of a vertical side of the aperture 203 opposite to the guide plate 206, and arranged in parallel therewith. The screws 209a and 209b have left and right hand threads, respectively, and accordingly, when the shaft 209 is rotated the shade plates 204 and 205 are moved toward each other to thus form the panoramic style frame, or are separated from each other to thereby form the standard frame, in accordance with the direction in which the shaft 209 is rotated.

The shaft 209 is rotated by a motor 213 through reduction gear mechanisms 210, 211 and 212. The motor 213 is driven by a drive control circuit 215 activated in accordance with a switching operation of an aperture size switch 214, whereby the shade plates 204 and 205 are moved to positions corresponding to the standard frame or the panoramic style frame. In the panoramic style frame, an upper side and a lower side of the panoramic size frame are defined by peripheries 204a and 205a of the shade plates 204 and 205. When the shade plates 204 and 205 reach the positions thereof corresponding to the standard frame or the panoramic style frame, this is sensed by switches 216 and 217 and the operation of the drive control circuit 215 is stopped. Note, the limit switches 216 and 217 also act as stoppers for stopping the shade plate 205 at the positions thereof corresponding to the standard frame and the panoramic style frame.

Figure 6:
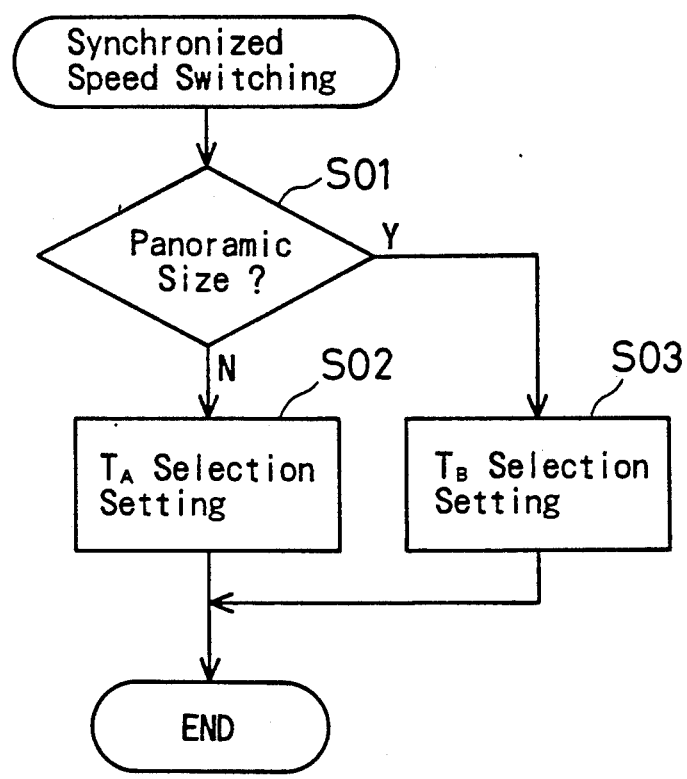
FIG. 6 is a flowchart showing a switching operation of the synchronized speed of the first embodiment.

An operation of switching the synchronized speed is described with reference to a flowchart shown in FIG. 6.

In Step S01, it is determined whether the aperture size has been switched by the aperture size switching means 21 to the panoramic style frame or the standard frame. When the standard frame is selected, the standard synchronized speed $T_A$ is read from the memory 17 in Step S02, and set to the synchronized speed setting means 15. Conversely, when the panoramic style frame is selected, the panoramic synchronized speed $T_B$ is read from the memory 17 in Step S03, and set to the synchronized speed setting means 15.

The synchronized speeds $T_A$ and $T_B$ are used in a usual photographing operation. For example, when a first automatic flash mode in which the flash is always output whenever the release switch is turned ON is selected, the synchronized speed $T_A$ and $T_B$ are read and set as an exposure shutter speed. Further, when a photometry value (a luminance of the object) is relatively low, and thus a second automatic flash mode is selected in which the output of the flash is controlled according to the photometry value, the synchronized speeds $T_A$ and $T_B$ are read and set as an exposure shutter speed. The exposure control means 31 operates the leading-shutter-curtain 33 and the trailing-shutter-curtain 35 to move at the synchronized speed $T_A$ or $T_B$ so that an exposure is carried out, and causes an output of the flash 45 when the X contact 41 is turned ON.

As described above, when the size of the aperture is changed in a direction in which the shutter-curtains are moved, especially when the aperture is reduced and the time for which the shutter is fully open is reduced, in this embodiment the synchronized speed is changed to a higher speed in accordance with the time for which the shutter is fully open. Therefore, in a photographing operation with a reduced-size aperture, a flash synchronized photographing of an object having a brighter luminance can be carried out than in a photographing operation with a standard aperture.

In the first embodiment, the output of the flash begun at the time $t_X$, which coincides with a cross point of the leading-shutter-curtain movement characteristic line 51 and the lower side 63 of the standard frame. As understood from FIG. 2, when the panoramic style frame is set, the leading-shutter-curtain movement characteristic line 51 crosses the lower side 67 of the panoramic style frame earlier than when crossing the lower side 63 of the standard frame. Accordingly, the output of the flash can be started at the time at which the leading-shutter-curtain movement characteristic line 51 crosses the lower side 67 of the panoramic style frame, i.e., when the leading-shutter-curtain has fully opened the aperture so that light output by the flash enters the whole area of the frame to be photographed. As a result, the trailing-shutter-curtain can be closed sooner than in the first embodiment, and accordingly, the synchronized speed can be made higher than that of the first embodiment. This operation is carried out by a second embodiment as described below.

Figure 7:
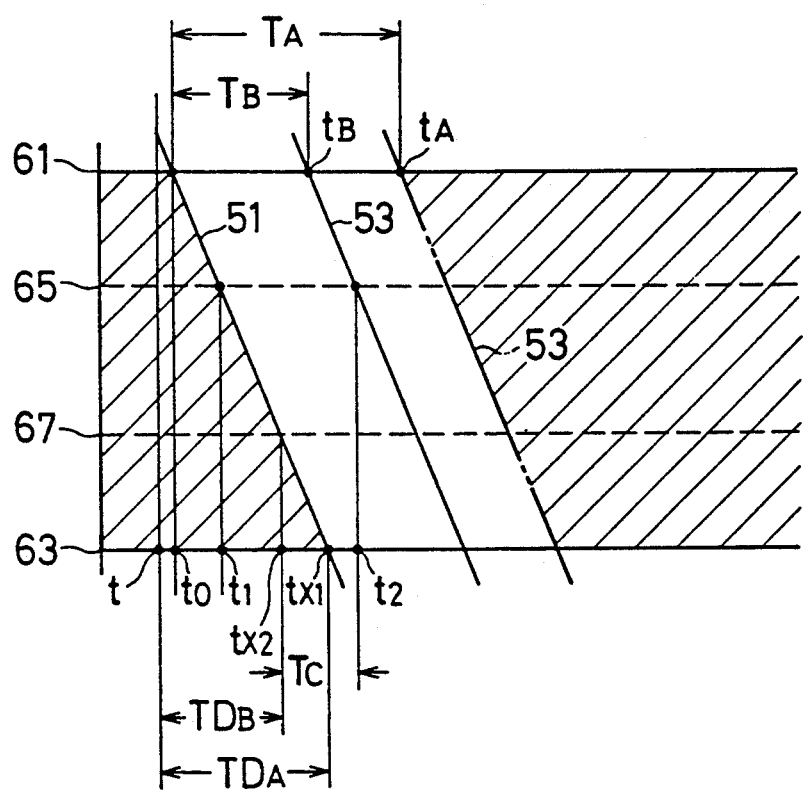
FIG. 7 is a graph showing a shutter operation characteristic of a second embodiment according to the present invention.

FIG. 7 is a graph showing a shutter operation characteristic of a camera of the second embodiment. Since this graph is similar to FIG. 2 showing the first embodiment, only the points different from FIG. 2 are described. Namely, the leading-shutter-curtain movement characteristic line 51 crosses the upper side 65 of the panoramic style frame at the time $t_1$ and the lower side 67 of the panoramic style frame at the time $t_{X2}$. The trailing-shutter-curtain movement characteristic line 53 crosses the upper side 65 of the panoramic style frame at the time $t_2$. An X contact delay time $TD_A$ is a time from a time t at which the movement of the leading-shutter-curtain is started to a time at which the X contact is turned ON, for a standard frame photographing operation. An X contact delay time $TD_B$ is the same time but used for a panoramic style frame photographing.

When the standard frame is set, the X contact delay time $TD_A$ is from the time t to a time $t_{X1}$ at which the leading-shutter-curtain has completely opened the aperture. This X contact delay time $TD_A$ is preset for operating the flash. Thus, when a shutter release is started at the time t, a timer count is started from the time t, and then at the time $t_{X1}$, at which the X contact delay time $TD_A$ has elapsed, the X contact is turned ON to cause an output by the flash.

When the panoramic style frame is set, the X contact delay time $TD_B$ is set in such a manner that the equation $TD_B = t_{X2} - t$ is satisfied. The synchronized speed $T_B$ is equal to $t_B - t_0$, wherein, at a time $t_B$, the trailing-shutter-curtain movement characteristic line 53, which satisfies the equation $T_C = t_2 - t_{X2} \geq T_{C0}$, crosses the upper side 61 of the standard frame, and accordingly, the flash is output for a flash output time $T_{C0}$.

A time $(t_{X1} - t_{X2})$ is that in which the leading-shutter-curtain 33 passes from the lower side 67 of the panoramic style frame to the lower side 63 of the standard frame. A time $(t_2 - t_B)$ is that in which the trailing-shutter-curtain 35 passes from the upper side 61 of the standard frame to the upper side 65 of the panoramic style frame. Therefore, in the panoramic style frame, if the X contact delay time $TD_B$ is set and the synchronized speed $T_B$ is selected, this panoramic synchronized speed $T_B$ becomes shorter than the standard synchronized speed $T_A$ by the amount by which the shutter-curtain is moved in accordance with reduction of the size of the aperture.

Figure 8:
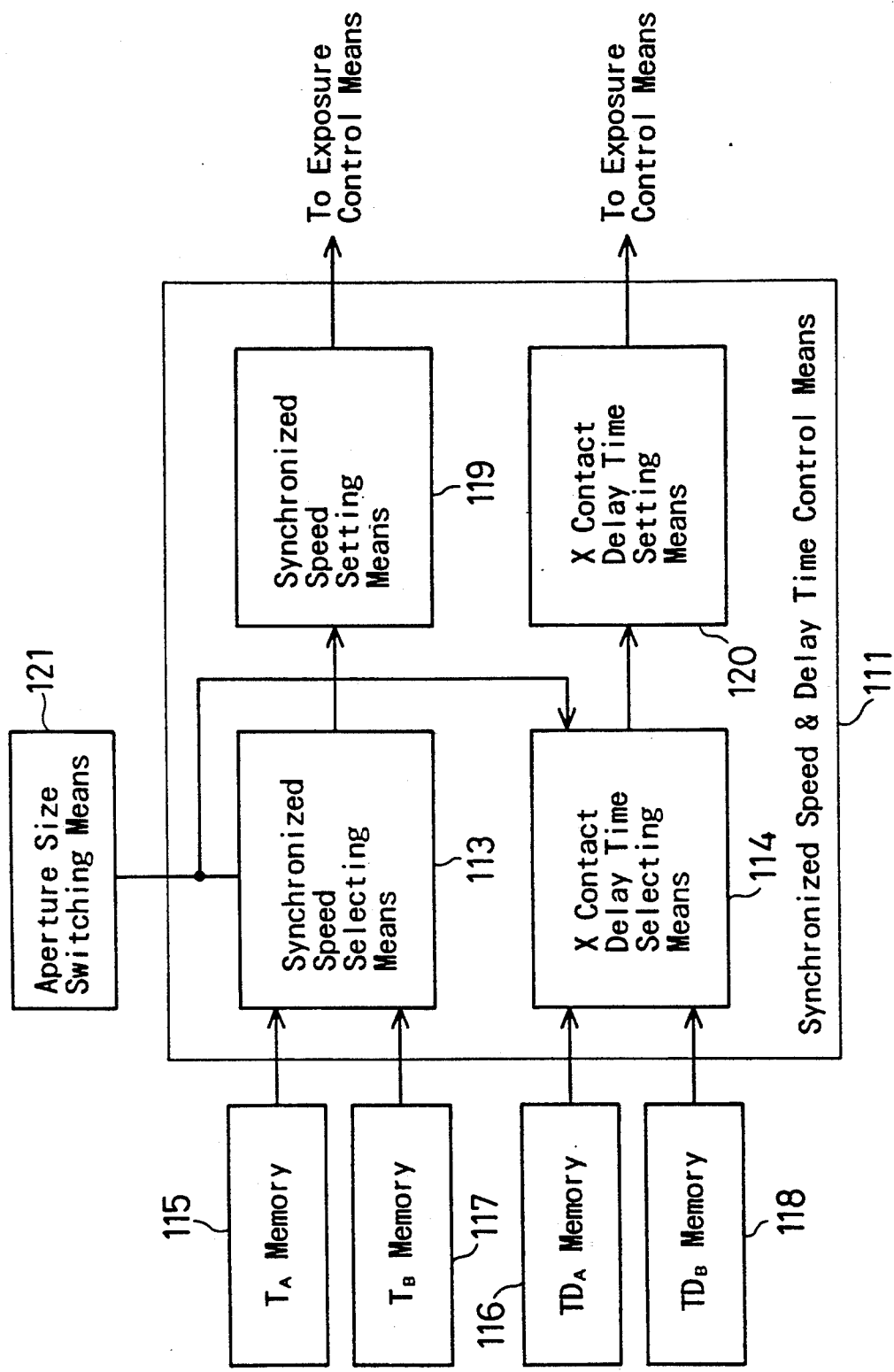
FIG. 8 is a block diagram showing a main part of a synchronized speed changing device of the second embodiment.
Figure 9:
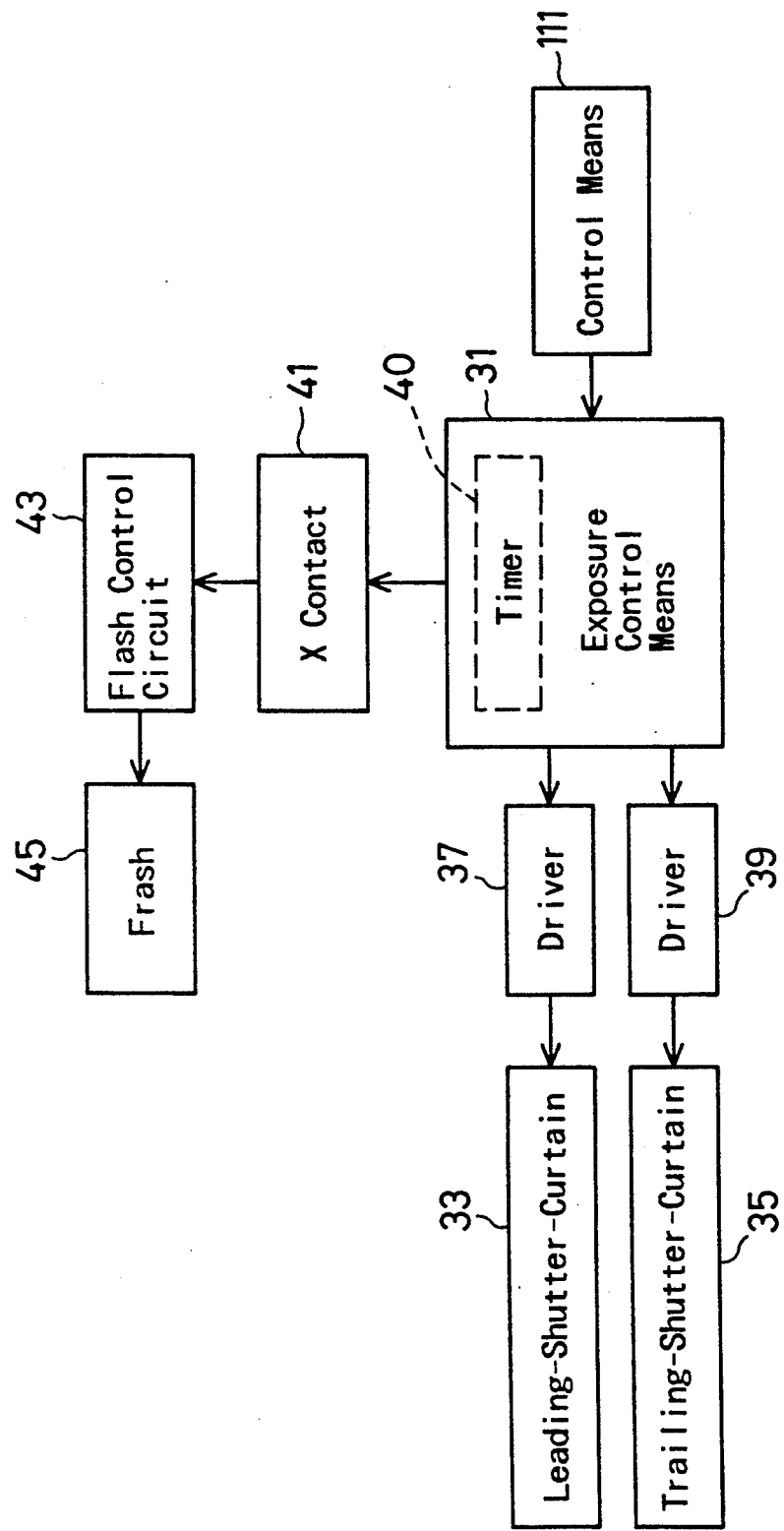
FIG. 9 is a block diagram showing a main part of an exposure control device of a camera to which the synchronized speed changing device of the second embodiment is applied.

A construction of a device for switching a synchronized speed of the second embodiment is explained with reference to FIGS. 8 and 9. In this switching device, the synchronized speed for the standard frame is set to the standard synchronized speed $T_A$, and the X contact delay time is set to the standard X contact delay time $TD_A$. The synchronized speed for the panoramic style frame is set to the panoramic synchronized speed $T_B$ and the X contact delay time is set to the panoramic X contact delay time $TD_B$.

As shown in the figures, a synchronized speed and delay time control means 111 includes a synchronized speed selecting means 113, an X contact delay time selecting means 114, a synchronized speed setting means 119 and an X contact delay time setting means 120. A standard synchronized speed memory 115 stores the standard synchronized speed $T_A$, and a panoramic synchronized speed memory 117 stores the panoramic synchronized speed $T_B$. A standard X contact delay time memory 116 stores the standard X contact delay time $TD_A$, and a panoramic X contact delay time memory 118 stores the panoramic X contact delay time $TD_B$.

One of the standard synchronized speed $T_A$ and the panoramic synchronized speed $T_B$ is selectively read by the synchronized speed selecting means 113, and stored in the synchronized speed setting means 119 as a synchronized speed. One of the standard X contact delay time $TD_A$ and the panoramic X contact delay time $TD_B$ is selectively read by the X contact delay time selecting means 114, and stored in the X contact delay time setting means 120 as an X contact delay time. Note, the X contact delay time selecting means 114 and an exposure control means 131 described later are provided for controlling a timing at which the flash is output.

An aperture size switching means 121 switches the aperture size between the standard frame (full size frame) and the panoramic style frame (reduced frame). The synchronized speed selecting means 113 selects a synchronized speed in accordance with an aperture size set by an aperture size switching means 121, and then the X contact delay time selecting means 114 selects an X contact delay time in accordance with the aperture size set by the aperture size switching means 121. Namely, the standard synchronized speed $T_A$ and the standard X contact delay time $TD_A$ are set when the standard frame is selected. The panoramic synchronized speed $T_B$ and the panoramic X contact delay time $TD_B$ are set when the panoramic style frame is selected.

The synchronized speeds $T_A$ and $T_B$ set by the synchronized speed setting means 119 and the delay times $TD_A$ and $TD_B$ set by the delay time setting means 120 are read by the exposure control means 131 when a flash mode is set in the camera, and accordingly, the shutter is controlled at the synchronized speed $T_A$ or $T_B$ and the X contact 41 is turned ON when the delay time $TD_A$ or $TD_B$ has elapsed.

The camera is provided with a timer 40 for measuring the delay time; the timer 40 being included in the exposure control means 31 for controlling the X contact 41. The remaining construction is the same as that of the first embodiment shown in FIG. 4, and therefore, a description thereof is omitted.

An operation of the second embodiment is almost the same as that of the first embodiment, except for a timing at which the X contact is turned ON. Namely, the X contact 41 is turned ON by the exposure control means 31 when the X contact delay time $TD_A$ or $TD_B$ has elapsed after the driver 37 has been activated to start the movement of the leading-shutter-curtain 33. The X contact delay time $TD_A$ and $TD_B$ are measured by the timer 40. When the X contact 41 is turned ON, the flash control circuit 43 causes an output by the flash 45.

The aperture size switching means 121 has the same construction as in the first embodiment shown in FIG. 5.

Figure 10:
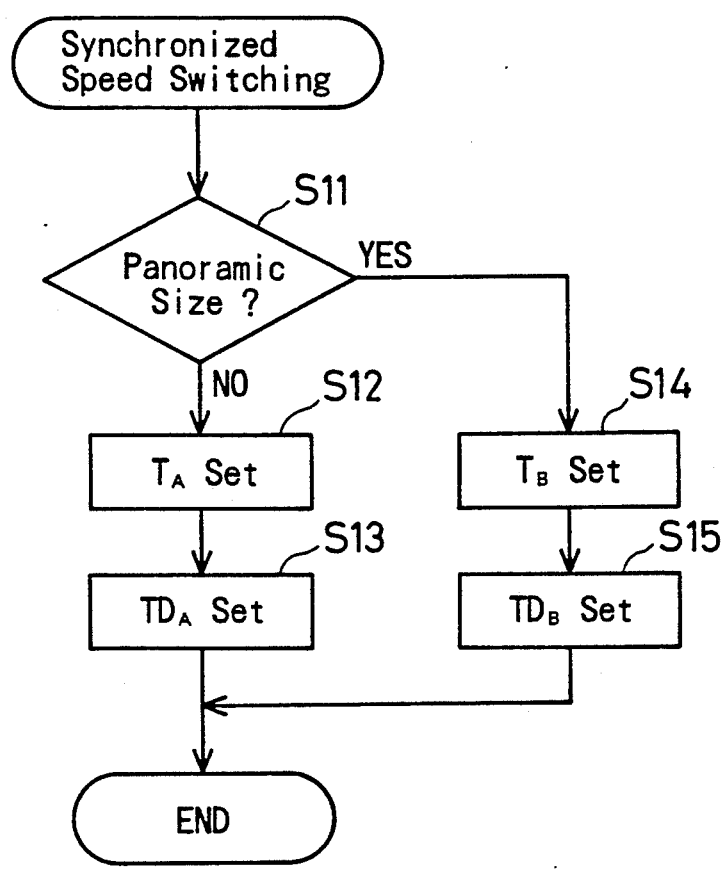
FIG. 10 is a flowchart showing a switching operation of the synchronized speed of the second embodiment.

An operation of switching the synchronized speed is described with reference to a flowchart shown in FIG. 10.

In Step S11, it is determined whether the aperture size has been switched by the aperture size switching means 121 to the panoramic style frame or to the standard frame. When the standard frame is selected, the standard synchronized speed $T_A$ is read from the memory 115 and set to the synchronized speed setting means 119 in Step S12, and then the standard X contact delay time $TD_A$ is read from the memory 116 and set to the X contact delay time setting means 120 in Step S13. Conversely, when the panoramic style frame is selected, the panoramic synchronized speed $T_B$ is read from the memory 117 and set to the synchronized speed setting means 119 in Step S14, and then the panoramic X contact delay time $TD_B$ is read from the memory 118 and set to the X contact delay time setting means 120 in Step S15.

The synchronized speeds $T_A$ or $T_B$ and the X contact delay time $TD_A$ or $TD_B$ are used in a usual photographing operation. For example, when a first automatic flash mode in which the flash is always output whenever the release switch is released is selected, the synchronized speeds $T_A$ or $T_B$ and the X contact delay time $TD_A$ or $TD_B$ are read and set as an exposure shutter speed. Further, when a photometry value is relatively low, and thus a second automatic flash mode is selected in which the output of the flash is controlled according to the photometry value, the synchronized speeds $T_A$ or $T_B$ and the X contact delay time $TD_A$ or $TD_B$ are read and set as an exposure shutter speed. The exposure control means 31 operates the leading-shutter-curtain 33 and the trailing-shutter-curtain 35 to move at the synchronized speed $T_A$ or $T_B$ so that an exposure is carried out, and turns the X contact 41 ON when the X contact delay time $TD_A$ or $TD_B$ has elapsed, to thereby cause an output of the flash 45.

As described above, in the second embodiment, when the size of the photographing frame is reduced in a direction in which the shutter-curtains are moved, the X contact delay time is shortened so that the output of the flash is started at a time at which the frame has just been fully opened. Accordingly, a preferred effect of the leading-shutter-curtain sync mode is obtained regardless of the aperture size. Further, the same effect is obtained in the second embodiment as in the first embodiment.

The first and second embodiments are related to the leading-shutter-curtain sync mode, in which the X contact is turned ON when the leading-shutter curtain has fully opened the aperture and the flash output is started. A third embodiment described below, however, is related to the trailing-shutter-curtain sync mode, in which the flash output is ended just before the trailing-shutter-curtain closes the aperture.

Figure 11:
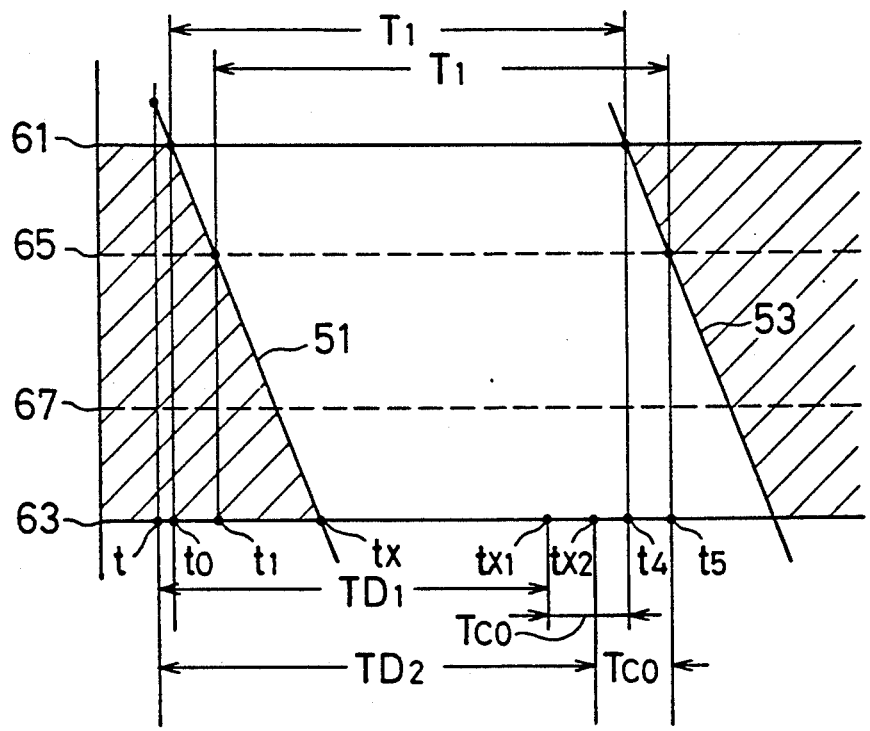
FIG. 11 is a graph showing a shutter operation characteristic of a third embodiment according to the present invention.

FIG. 11 is a graph showing a shutter operation characteristic of a camera of the third embodiment having a selecting mechanism by which one of the leading-shutter-curtain sync mode and the trailing-shutter-curtain sync mode is selected. The third embodiment also has the aperture size changing mechanism by which the aperture size can be changed between a standard frame size and a panoramic style frame size.

In this graph, similar to FIGS. 2 and 7, the standard frame is defined by the upper side 61 and the lower side 63, and the panoramic style frame is defined by the upper side 65 and the lower side 67. The reference numeral 51 shows the leading-shutter-curtain movement characteristic line, and reference numeral 53 shows the trailing-shutter-curtain movement characteristic line. An area defined by the leading-shutter-curtain movement characteristic line 51, the trailing-shutter-curtain movement characteristic line 53 and the upper and lower sides 61 and 63 of the standard frame, or the upper and lower sides 65 and 67, is an opening area of the shutter.

When the standard frame is set, the flash is output for a time $T_{c0}$ in such a manner that the output is ended at a time $t_4$ when the trailing-shutter-curtain has started to close the standard frame. Namely, the flash output is started at a time $t_{x1}$, which is a time immediately after a standard delay time $TD_1$ has elapsed, since the movement of the leading-shutter-curtain was started at the time t. Therefore, when the time $T_{c0}$ has elapsed from the start of the flash output, the trailing-shutter-curtain starts to close the standard frame. Namely, the trailing-shutter-curtain movement characteristic line 53 crosses the upper side 61 at the time $t_4$. The delay time $TD_1$ is obtained by the equation $TD_1 = T_1 - T_{c0} + (t_0 - t)$, wherein $T_1$ is a shutter speed, and $t_0$ is a time at which the leading-shutter-curtain starts to open the standard frame, i.e., when the leading-shutter-curtain movement characteristic line 51 crosses the upper side 61 of the standard frame.

When the panoramic style frame is set, the flash is output for a time $T_{c0}$ in such a manner that the output is ended at a time $t_5$ at which the trailing-shutter-curtain starts to close the panoramic style frame. Namely, the flash output is started at a time $t_{x2}$, which is a time immediately after a standard delay time $TD_2$ has elapsed since the movement of the leading-shutter-curtain was started at the time t. Therefore, when the time $T_{c0}$ has elapsed from the start of the output of the flash, the trailing-shutter-curtain starts to close the panoramic style frame. Namely, the trailing-shutter-curtain movement characteristic line 53 crosses the upper side 65 at time $t_5$. The delay time $TD_2$ is obtained by the equation $TD_2 = T_1 - T_{c0} + (t_1 - t)$, wherein $t_1$ is a time at which the leading-shutter-curtain starts to open the panoramic style frame, i.e., when the leading-shutter-curtain movement characteristic line 51 crosses the upper side 65 of the panoramic style frame.

Note, the slower the shutter speed $T_1$, the greater the effect of the trailing-shutter-curtain sync mode, and therefore, it is preferable that $T_1 > (t_x - t) + T_{c0}$.

An operation in the leading-shutter-curtain sync mode is similar to that of the second embodiment described with reference to FIG. 7.

Figure 12:
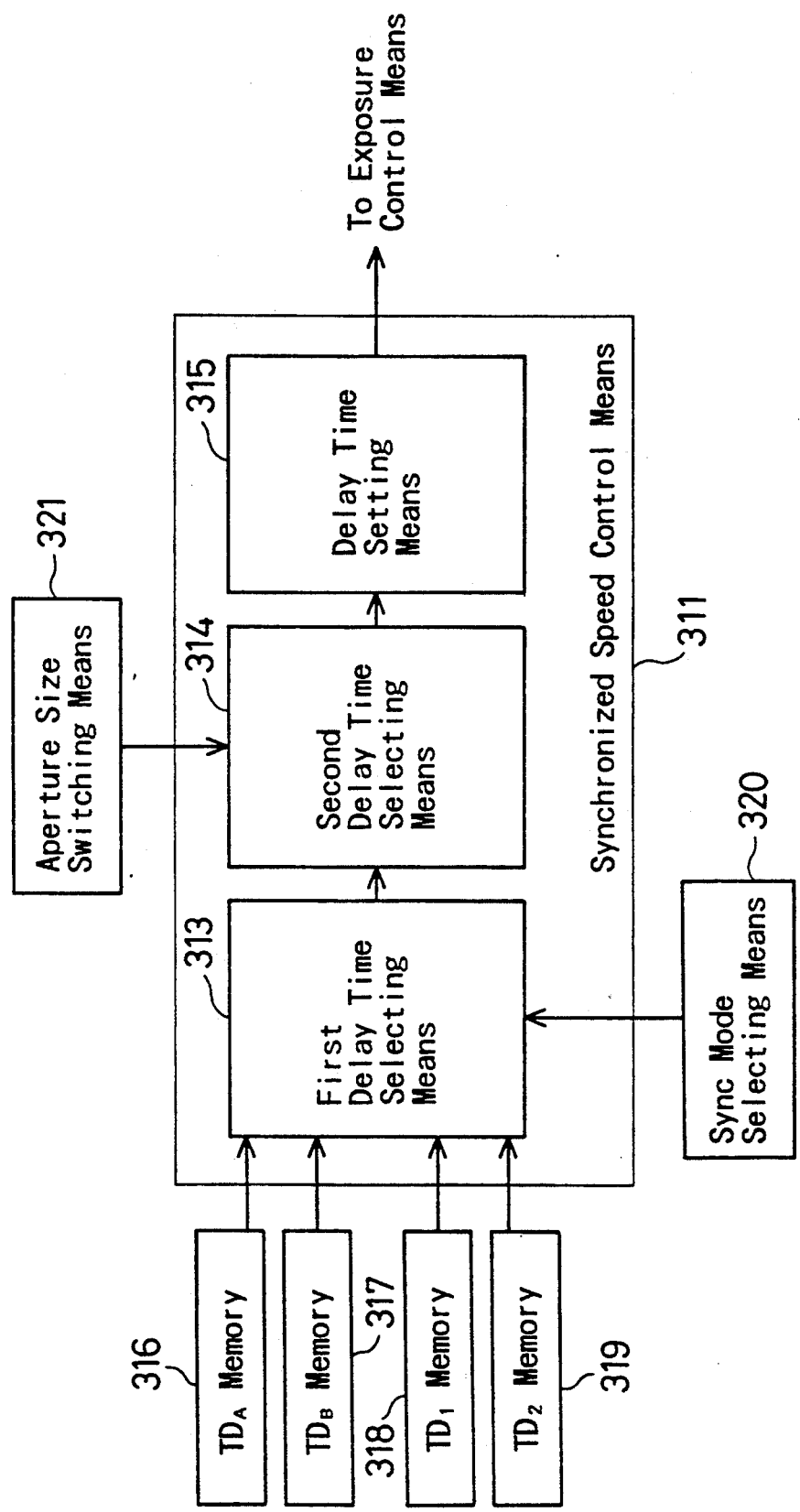
FIG. 12 is a block diagram showing a main part of a synchronized speed changing device of the third embodiment.

A construction of a device for switching a synchronized speed in the third embodiment is described with reference to FIG. 12. Here, the switching device switches the synchronized speed between the standard synchronized speed $T_A$ and the panoramic synchronized speed $T_B$.

As shown in the figure, a synchronized speed control means 311 includes a first delay time selecting means 313, a second delay time selecting means 314, and a delay time selecting means 315. The second delay time selecting means 314 select an X contact delay time from delay times selected by the first delay time selecting means 313. The delay time setting means 315 set the delay time selected by the second delay time selecting means 314 and outputs the selected delay time to an exposure control means.

A standard frame delay time memory 316 stores the standard frame delay time $TD_A$ for the leading-shutter-curtain sync mode, and a panoramic style frame delay time memory 317 stores the panoramic style frame delay time $TD_B$ for the leading-shutter-curtain sync mode. A standard frame delay time memory 318 stores the standard frame delay time $TD_1$ for the trailing-shutter-curtain sync mode, and a panoramic style frame delay time memory 319 stores the panoramic style frame delay time $TD_2$ for the trailing-shutter-curtain sync mode.

The shutter-curtain delay time selecting means 313 selects the delay times $TD_A$ and $TD_B$ stored in the standard frame delay time memory 316 and the panoramic style frame delay time memory 317, or the delay times $TD_1$ and $TD_2$ stored in the standard frame delay time memory 318 and the panoramic style frame delay time memory 319, in accordance with a selection made by a sync mode selecting means 320. The second delay time selecting means 314 selects one delay time corresponding to the standard frame size or the panoramic style frame size switched by the aperture size switching means 321, from the delay times $TD_A$ and $TD_B$ or the delay times $TD_1$ and $TD_2$, which are selected by the first delay time selecting means 313. The delay time selected by the second delay time selecting means 314 is set to the delay time setting means 315. When a photographing is carried out in a flash mode, the delay time set to the delay time setting means 315 is read by the exposure control means, which have the same construction as in the second embodiment (see FIG. 9), and is used as an X contact delay time.

The exposure control means turns the X contact ON when a timer in the exposure control means measures the delay time $TD_1$, $TD_2$, $TD_A$ or $TD_B$ set to the delay time setting means 315, and accordingly, the flash is output.

The aperture size switching means 321 has the same construction as in the first embodiment shown in FIG. 5.

Figure 13:
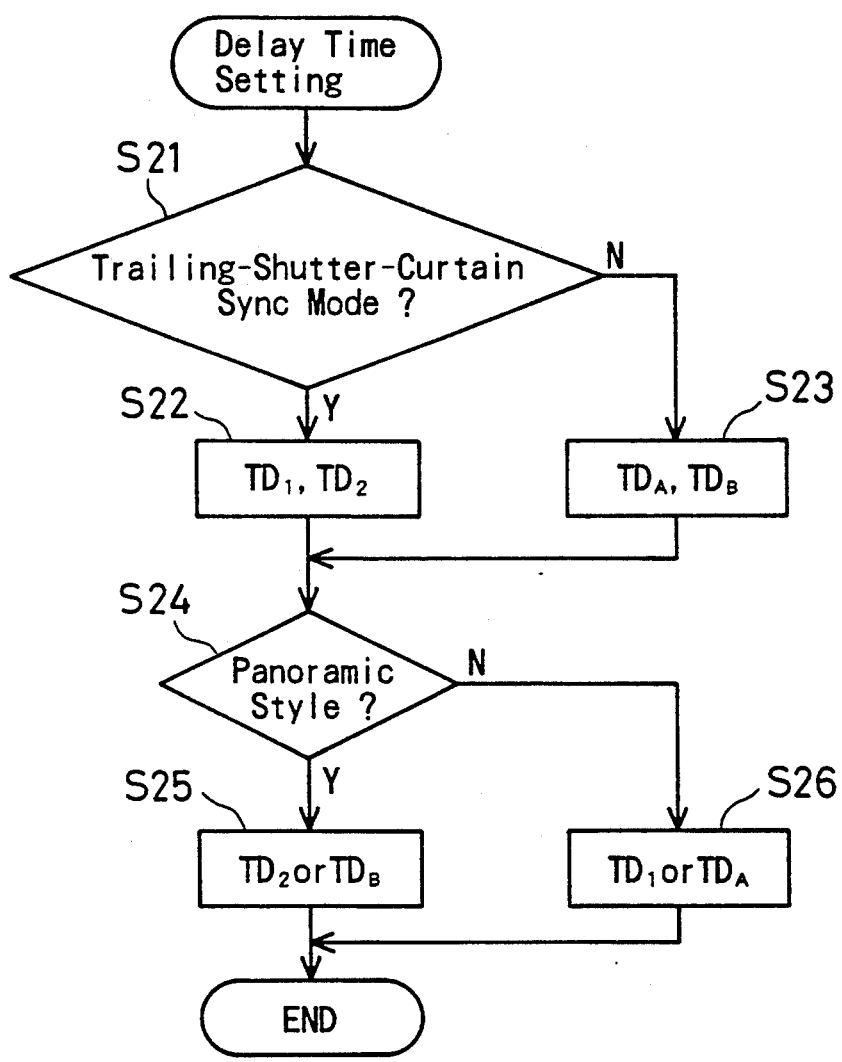
FIG. 13 is a flowchart showing a switching operation of the synchronized speed of the third embodiment.

An operation of selecting the delay time is described with reference to a flowchart shown in FIG. 13.

In Step S21, it is determined whether or not the trailing-shutter-curtain sync mode is selected. When the trailing-shutter-curtain sync mode is set, the delay times $TD_1$ and $TD_2$ corresponding to this mode are selected by the first delay time selecting means 313 in Step S22. Conversely, when the leading-shutter-curtain sync mode is set, the delay times $TD_A$ and $TD_B$ corresponding to that mode are selected by the first delay time selecting means 313 in Step S23. Then, in Step S24, it is determined whether or not the panoramic style frame is set. When the panoramic style frame is set, the delay time $TD_2$ or $TD_B$ is selected in Step S25 by the second delay time selecting means 314 and set to the delay time setting means 315. Conversely, when the standard frame is set, the delay time $TD_1$ or $TD_A$ is selected in Step S26 by the second delay time selecting means 314 and set to the delay time setting means 315.

Note, in FIG. 11, the flash output $T_{c0}$, and the times $(t_0-t)$ and $(t_1-t)$ are constant. Accordingly, in a camera in which a shutter speed can be changed in the trailing-shutter-curtain sync mode, these values may be measured and stored in a memory, and thus the delay times $TD_1$ and $TD_2$ can be obtained in accordance with these values and a shutter speed $T_1$ set by a photographer.

As described above, in the third embodiment, a timing at which the flash is output is changed in accordance with the frame size, in the trailing-shutter-curtain sync mode. Namely, in the panoramic style frame, in which the frame size is reduced in comparison with that of the standard frame in a direction in which the shutter curtains are moved, a timing at which the X contact is turned ON is delayed in accordance with a time at which the trailing-shutter-curtain starts to close the panoramic style frame. Therefore, a desired effect of the trailing-shutter-curtain sync mode is obtained in the panoramic style frame.

Although the synchronized speed control means 11 (first embodiment), the synchronized speed & delay time control means 111 (second embodiment) and the synchronized speed control means 311 (third embodiment) are arranged independently from the exposure control means 31, these means can be combined in one microprocessor.

In the above embodiments, the present invention is applied to a camera in which the frame size is changed by the shade plates 204 and 205, which are mechanically moved to cover parts of a photographing frame. The present invention, however, is not restricted to such a construction.

Figure 14:
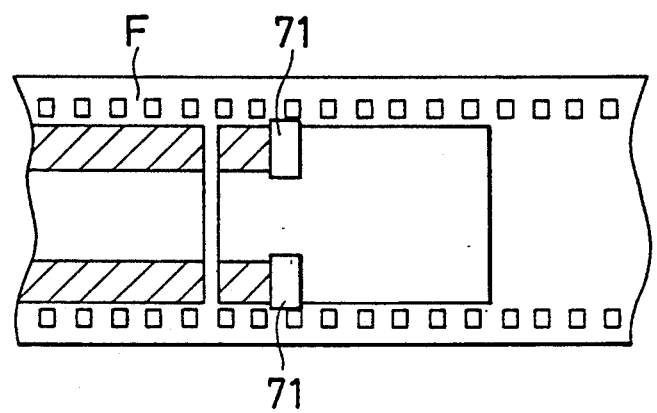
FIG. 14 shows a film in which a photographing operation is carried out in the panoramic style frame mode by a mechanism other than that shown in FIG. 5.

Namely, as shown in FIG. 14, for a photographing operation with the panoramic style frame, a construction in which the frame size is mechanically changed as shown in FIG. 5 is not provided, but instead a pair of light sources 71 are disposed at an upper portion of the film F and a lower portion of the film F, respectively. These upper and lower portions of the film F are exposed during a winding operation of film by the light sources 71, to thus form a panoramic style frame. Similar to the above embodiments, these upper and lower portions are located at opposite positions in a direction in which the shutter-curtains are moved.

Figure 15:
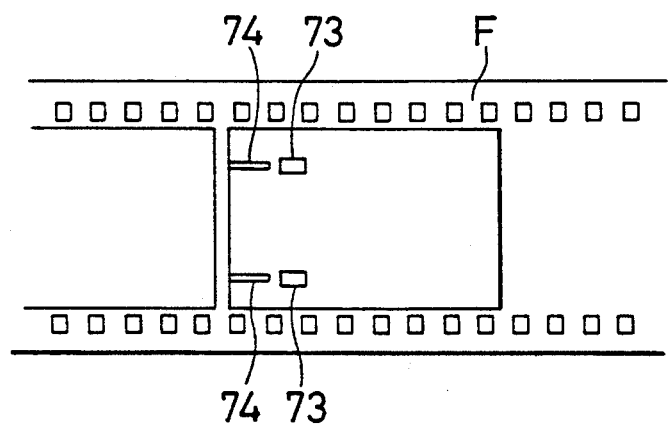
FIG. 15 shows a film in which a photographing operation is carried out in the panoramic style frame mode by a mechanism other than that shown in FIG. 14.

Further, as shown in FIG. 15, a pair of light sources 73 may be disposed at an upper portion of the film F and a lower portion of the film F, respectively. Recognition marks 74 showing a size of the panoramic style frame are formed on these upper and lower portions, which are located at opposite positions in the direction in which the shutter-curtains are moved. Therefore, in the printing of the frame, the recognition marks are sensed, and accordingly, the frame is printed as a panoramic style frame.

Furthermore, the present invention can be applied to a camera in which a half size film is used and the frame size can be changed transverse to a direction in which the shutter-curtains are moved. Note, the change of the photographing frame size is not restricted to the panoramic style size. Namely, the present invention is applicable to a camera in which the frame size can be changed transverse to a direction in which the shutter-curtains are moved.

Although the embodiments of the present invention have been described herein with reference to the accompanying drawings, obviously many modifications and changes may be made by those skilled in this art without departing from the scope of the invention.

The present disclosure relates to subject matter contained in Japanese patent application No. 3-222529 (filed on May 24, 1991) and in Japanese patent applications Nos. 3-223764 and 3-223765 (filed on May 27, 1991) which are expressly incorporated herein by reference in its entirety.

I claim:

1. A camera including a flash device comprising:
    a focal-plane shutter including a leading-shutter-curtain and a trailing-shutter-curtain which are moved in a predetermined direction to open and close a film exposure aperture to thereby expose a film;
    means for changing a size of said film aperture to a frame size corresponding to a change in said predetermined direction in which said leading and trailing-shutter-curtains are moved;
    means for switching said flash device to cause an output of said flash device; and
    means for controlling said switching means in accordance with a size of said film aperture so that the output of said flash is ended just before said trailing-shutter-curtain starts to close said film aperture.

2. A camera according to claim 1, wherein said control means controls said switching means to start an output of said flash when a predetermined delay time has elapsed since a movement of said leading-shutter-curtain has started.

3. A camera according to claim 2, wherein said control means comprises means for selecting one of a normal leading-shutter-curtain sync mode and a trailing-shutter-curtain sync mode, said switching means being turned ON in the normal leading-shutter-curtain sync mode when said leading-shutter-curtain has fully opened said aperture, and being turned OFF in the trailing-shutter-curtain sync mode when said trailing-shutter-curtain has started to close said aperture.

4. A camera according to claim 1, wherein said control means comprises means for selecting one of a normal leading-shutter-curtain sync mode and a trailing-shutter-curtain sync mode, said switching means being turned ON in the normal leading-shutter-curtain sync mode when said leading-shutter-curtain has fully opened said aperture, and being turned OFF in the trailing-shutter-curtain sync mode when said trailing-shutter-curtain has started to close said aperture.

5. A camera including a flash device comprising:
    a focal plane shutter including a leading-shutter-curtain and a trailing-shutter-curtain which are moved in a predetermined direction to open and close a film exposure aperture to expose a film;
    means for changing a size of said film aperture to a selected frame size by changing a dimension in a direction in which said leading and trailing shutter curtains are moved;
    means for changing a synchronizing mode of said flash device between a leading-shutter-curtain synchronization mode and a trailing-shutter-curtain synchronization mode;
    means for switching said flash device to cause an output of said flash device; and
    means for controlling said switching means in accordance with a size of said film aperture and in accordance with a synchronization mode, said controlling means comprising means for selecting a time for actuation of said switching means in accordance with a size of said film aperture and a synchronization mode.

6. The camera including a flash device according to claim 5, said controlling means controlling said flash when said trailing-shutter-curtain synchronization mode is selected so that an output of said flash device is ended just before said trailing-shutter-curtain starts to close said film aperture.

* * * * *

UNITED STATES PATENT AND TRADEMARK OFFICE
CERTIFICATE OF CORRECTION

PATENT NO. : 5,327,183
DATED : July 5, 1994
INVENTOR(S) : Hiroshi KUREI

It is certified that error appears in the above-indentified patent and that said Letters Patent is hereby corrected as shown below:

On the cover, in section [73], Assignee, line 1, insert ---Kogyo--- after "Kogaku".

Signed and Sealed this

Fifth Day of September, 1995

Attest:

BRUCE LEHMAN

Attesting Officer   Commissioner of Patents and Trademarks